United States Patent
Yamada et al.

(10) Patent No.: US 10,259,683 B2
(45) Date of Patent: Apr. 16, 2019

(54) METHOD FOR CONTROLLING AN ELEVATOR SYSTEM

(71) Applicant: Otis Elevator Company, Farmington, CT (US)

(72) Inventors: Takahiro Yamada, Narita (JP); Naoki Taniguchi, Sakura (JP); Keiji Hashimoto, Sakura (JP); Kenichi Ohmura, Yotsukaido (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 96 days.

(21) Appl. No.: 15/438,888

(22) Filed: Feb. 22, 2017

(65) Prior Publication Data
US 2018/0237256 A1 Aug. 23, 2018

(51) Int. Cl.
| | |
|---|---|
| *G05B 15/00* | (2006.01) |
| *B66B 1/46* | (2006.01) |
| *G05B 17/02* | (2006.01) |
| *B66B 1/34* | (2006.01) |
| *B66B 1/24* | (2006.01) |

(52) U.S. Cl.
CPC ............ *B66B 1/468* (2013.01); *B66B 1/2408* (2013.01); *B66B 1/3476* (2013.01); *G05B 17/02* (2013.01); *B66B 2201/215* (2013.01); *B66B 2201/222* (2013.01)

(58) Field of Classification Search
CPC ..... B66B 1/2408; B66B 1/468; B66B 5/0012; B66B 2201/103; B66B 2201/405; B66B 2201/4615; B66B 2201/215; B66B 2201/222; B66B 1/3476; B66B 1/2458; G05B 17/02

USPC ........................................................ 187/247
See application file for complete search history.

(56) References Cited

U.S. PATENT DOCUMENTS

| | | | |
|---|---|---|---|
| 4,044,860 A | 8/1977 | Kaneko et al. | |
| 5,258,586 A * | 11/1993 | Suzuki | B66B 1/2458 187/380 |
| 5,298,697 A | 3/1994 | Suzuki et al. | |
| 5,490,580 A * | 2/1996 | Powell | B66B 1/2408 187/281 |
| 5,973,732 A | 10/1999 | Guthrie | |
| 6,084,367 A | 7/2000 | Landert | |
| 6,257,373 B1 | 7/2001 | Hikita et al. | |

(Continued)

FOREIGN PATENT DOCUMENTS

| | | |
|---|---|---|
| CN | 105173945 A | 12/2015 |
| JP | 2008120548 A | 5/2008 |

(Continued)

OTHER PUBLICATIONS

Koehler, et al.; "An AI-Based Approach to Destination Control in Elevators"; 2002; AI Magazine, vol. 23, No. 3; 20 pages.

(Continued)

*Primary Examiner* — Jeffrey Donels
(74) *Attorney, Agent, or Firm* — Cantor Colburn LLP

(57) ABSTRACT

A method for controlling an elevator system comprises obtaining images of the inside of an elevator car, detecting passengers in the images, creating graphic passenger models of the detected passengers from the images and determining the number of passengers who may additionally board the elevator car using the passenger models. The passenger models may reflect the actual size of the passengers.

9 Claims, 12 Drawing Sheets

(56) References Cited

U.S. PATENT DOCUMENTS

| | | |
|---|---|---|
| 8,020,672 B2 | 9/2011 | Lin et al. |
| 8,547,437 B2 | 10/2013 | Buehler et al. |
| 8,573,366 B2 | 11/2013 | Elomaa et al. |
| 9,390,335 B2 | 7/2016 | Lee |
| 2011/0174580 A1* | 7/2011 | Tokura ................. B66B 1/2458 187/382 |
| 2012/0125719 A1* | 5/2012 | Sundholm ............. B66B 1/2458 187/382 |
| 2015/0073748 A1 | 3/2015 | Mattsson et al. |
| 2016/0130112 A1 | 5/2016 | Nikovski |
| 2016/0289042 A1* | 10/2016 | Fang ........................ G06T 7/10 |
| 2016/0289043 A1* | 10/2016 | Fang .................... B66B 13/146 |
| 2016/0289044 A1* | 10/2016 | Hsu ...................... B66B 1/2408 |
| 2016/0291558 A1* | 10/2016 | Finn ........................ B66B 1/468 |
| 2016/0292515 A1* | 10/2016 | Jia ............................ B66B 3/02 |
| 2016/0292521 A1* | 10/2016 | Fang .................... B66B 1/2408 |
| 2016/0292522 A1* | 10/2016 | Chen .................... B66B 1/3476 |
| 2016/0295192 A1* | 10/2016 | Hsu ...................... B66B 1/2408 |
| 2016/0297642 A1* | 10/2016 | Finn .................... B66B 1/3476 |
| 2016/0340148 A1* | 11/2016 | Salmikuukka .......... B66B 1/468 |

FOREIGN PATENT DOCUMENTS

| | | |
|---|---|---|
| JP | 5784051 B2 | 9/2015 |
| JP | 5812894 B2 | 11/2015 |
| WO | 2012077863 A1 | 6/2012 |
| WO | 2014111127 A1 | 7/2014 |

OTHER PUBLICATIONS

European Search Report for application EP 18158212.3, dated Sep. 24, 2018, 8 pages.

\* cited by examiner

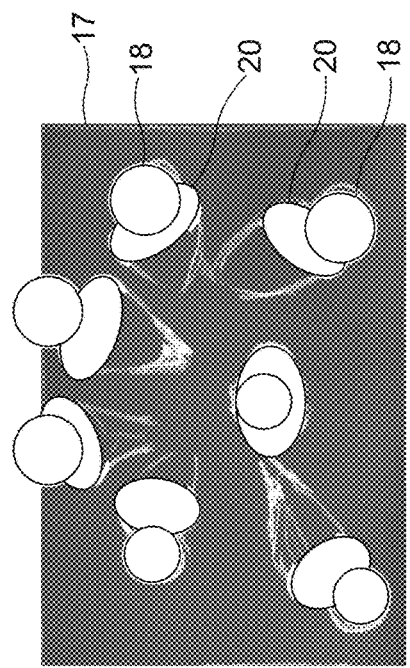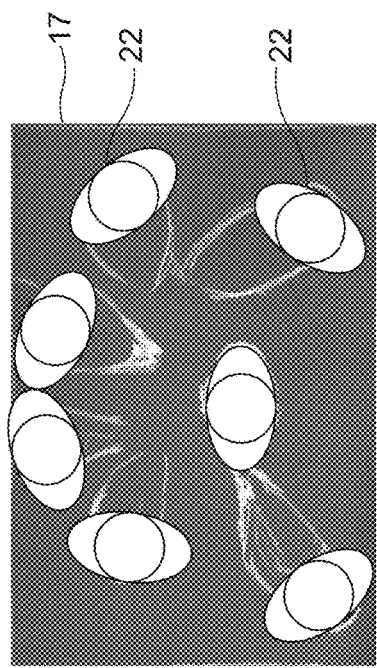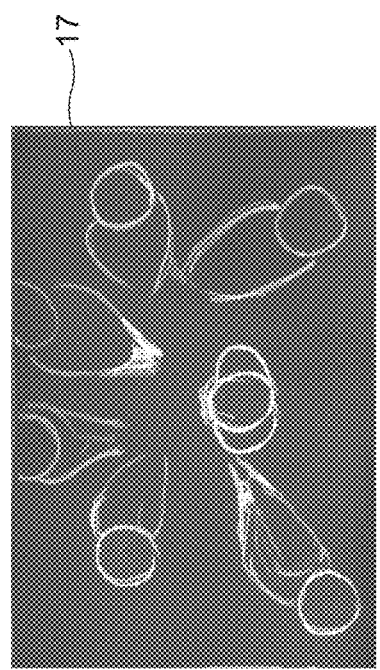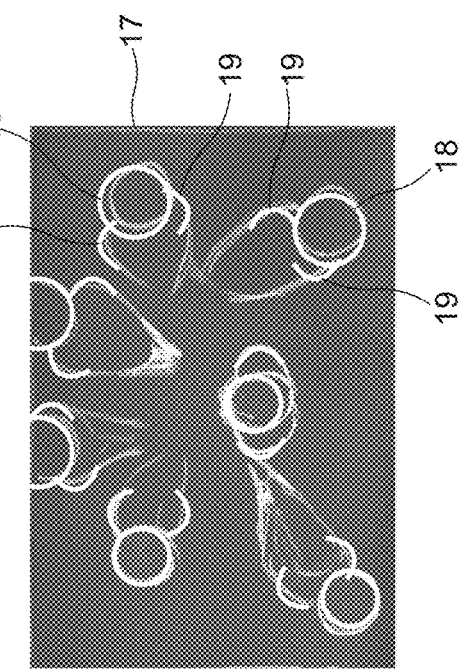

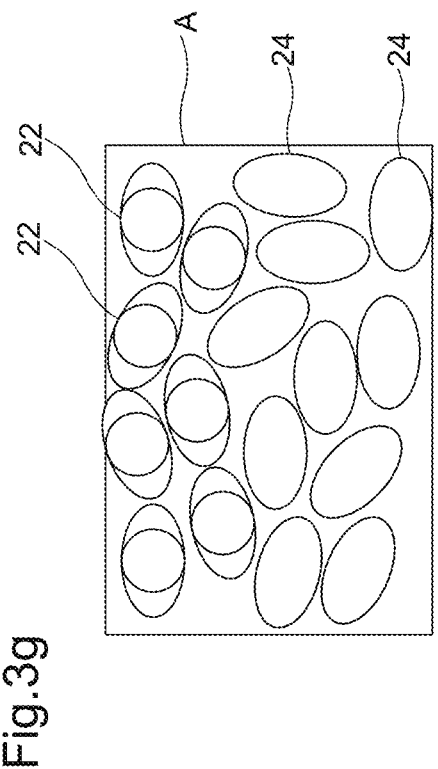
Fig.3e
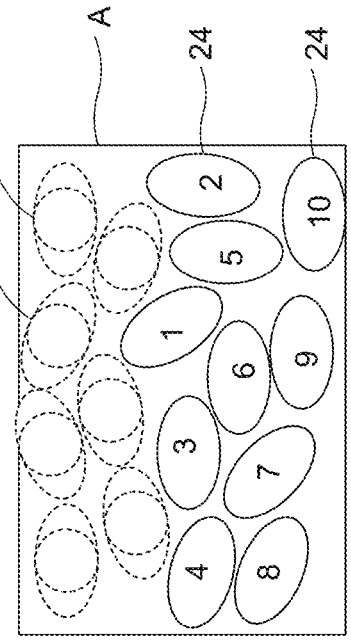
Fig.3g
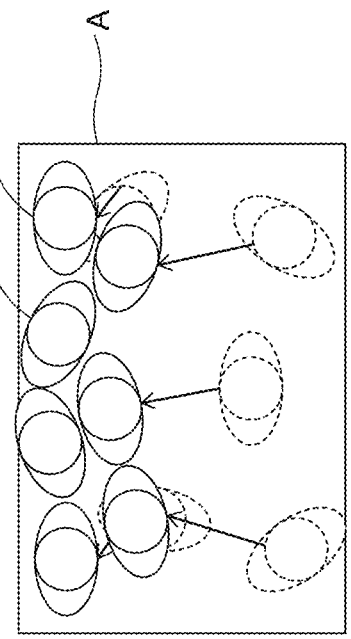
Fig.3f
Fig.3h

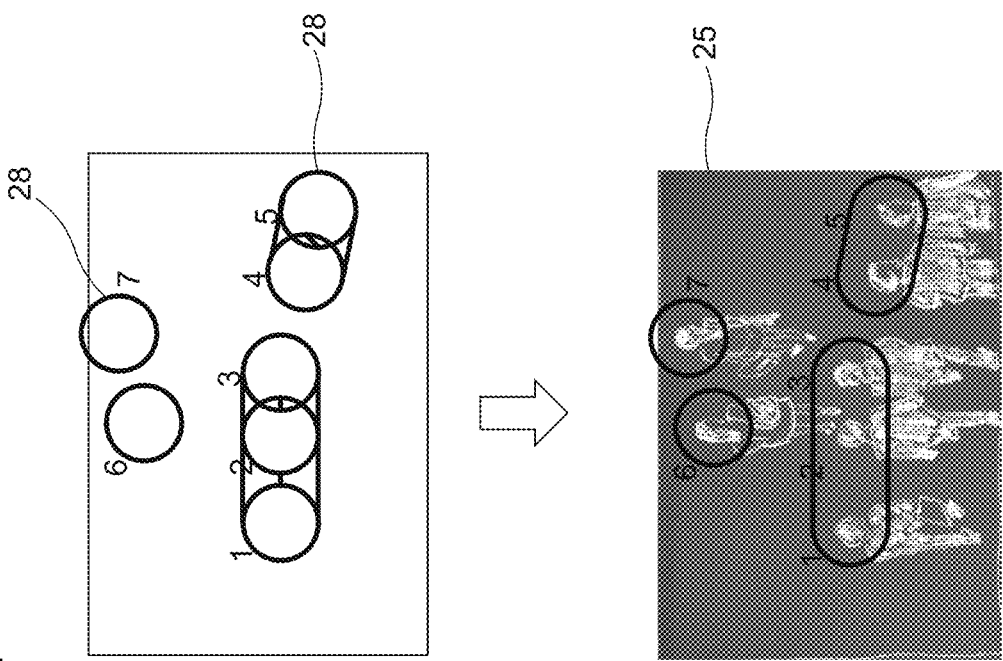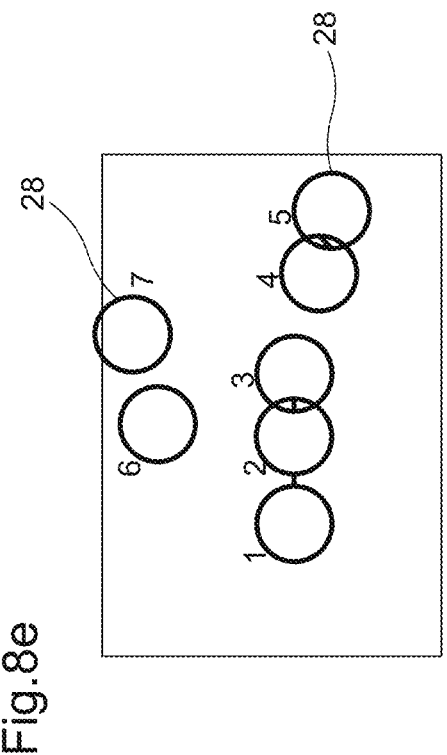

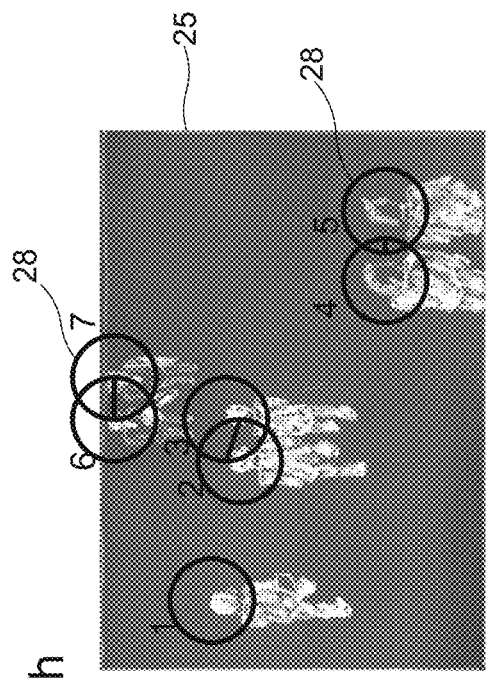
Fig.8h
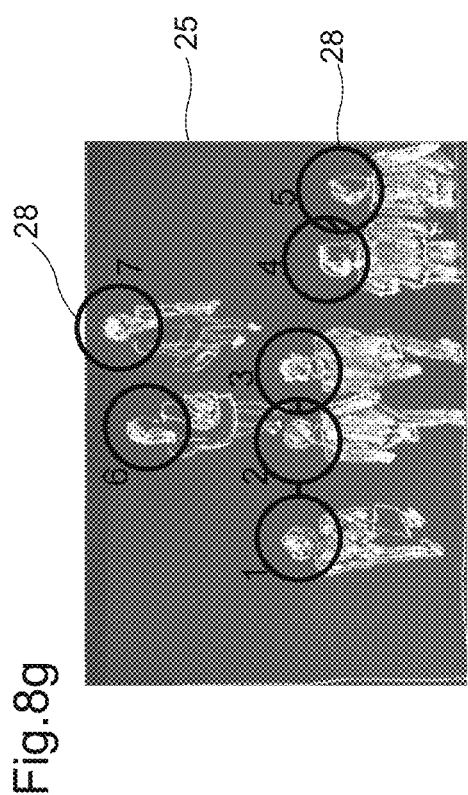
Fig.8g
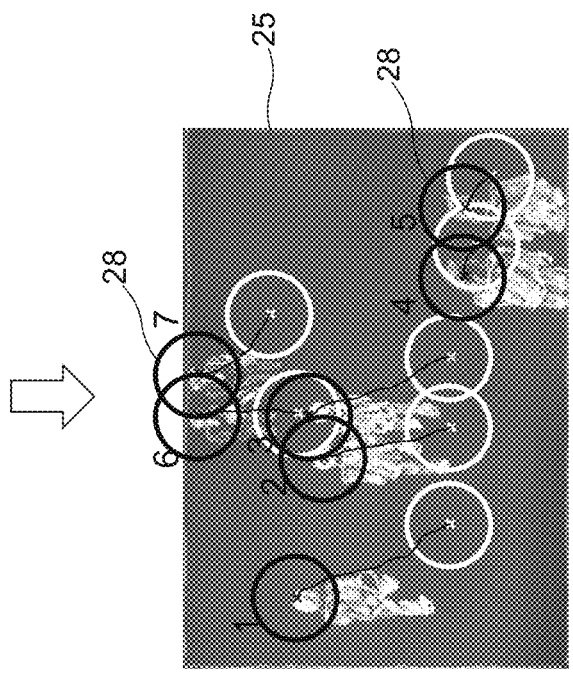

METHOD FOR CONTROLLING AN ELEVATOR SYSTEM

BACKGROUND

This invention generally relates to elevator systems. More particularly, this invention relates to determining how many more passengers can actually get on an elevator car and assigning cars based on this determination.

Modern elevator systems allow passengers to request elevator service in various ways. Some systems provide conventional hall call buttons that allow a passenger to indicate a desire to travel up or down from a particular landing. A car operating panel in an elevator car allows the passenger to indicate the floor to which the passenger desires to travel. Other systems include destination entry passenger interfaces that allow a passenger to indicate a desired destination before the passenger boards an elevator car. Such systems assign an elevator car to each passenger according to known car assignment algorithms.

Destination entry systems can improve elevator service for passengers by handling larger traffic volumes more efficiently and avoiding elevator lobby crowding, for example. One issue presented by such systems, however, is that the car assignments are made without any information regarding how many more passengers can actually get on the elevator car. Passengers assigned to a particular car may not be able to get on the assigned car or select not to board the assigned car since there is not enough room in the car even though the load inside the car is well within the capacity of the car. This not only causes wasteful stops but impairs the efficiency of the whole system.

A further issue is presented when the passengers comprise groups of passengers wishing to get on an elevator car together.

In view of the above and other considerations, there is a need for a method for controlling an elevator system which determines how many more passengers can actually get on an elevator car and assigns cars based on this determination.

BRIEF SUMMARY

According to one embodiment of the invention, a method for controlling an elevator system comprises obtaining images of the inside of an elevator car, detecting passengers in the images, creating graphic passenger models of the detected passengers from the images and determining the number of passengers who may additionally board the elevator car using the passenger models. The passenger models may reflect the actual size of the passengers.

Determining the number of passengers who may additionally board the elevator car may comprise, placing the passenger models in an image area representing elevator car space so that the passenger models do not overlap, adding standard models representing a standard-sized passenger in the image area until there is no more space for an additional standard model and setting the number of standard models included in the image area as the number of passengers who may additionally board the elevator car.

BRIEF DESCRIPTION OF THE DRAWINGS

FIGS. 3a to 3h illustrate example results of the process performed in FIG. 2.

FIGS. 8a to 8h illustrate example results of the process performed in FIGS. 4 to 7.

The detailed description explains embodiments of the invention, together with advantages and features, by way of example with reference to the drawings.

DETAILED DESCRIPTION

Figure 1:
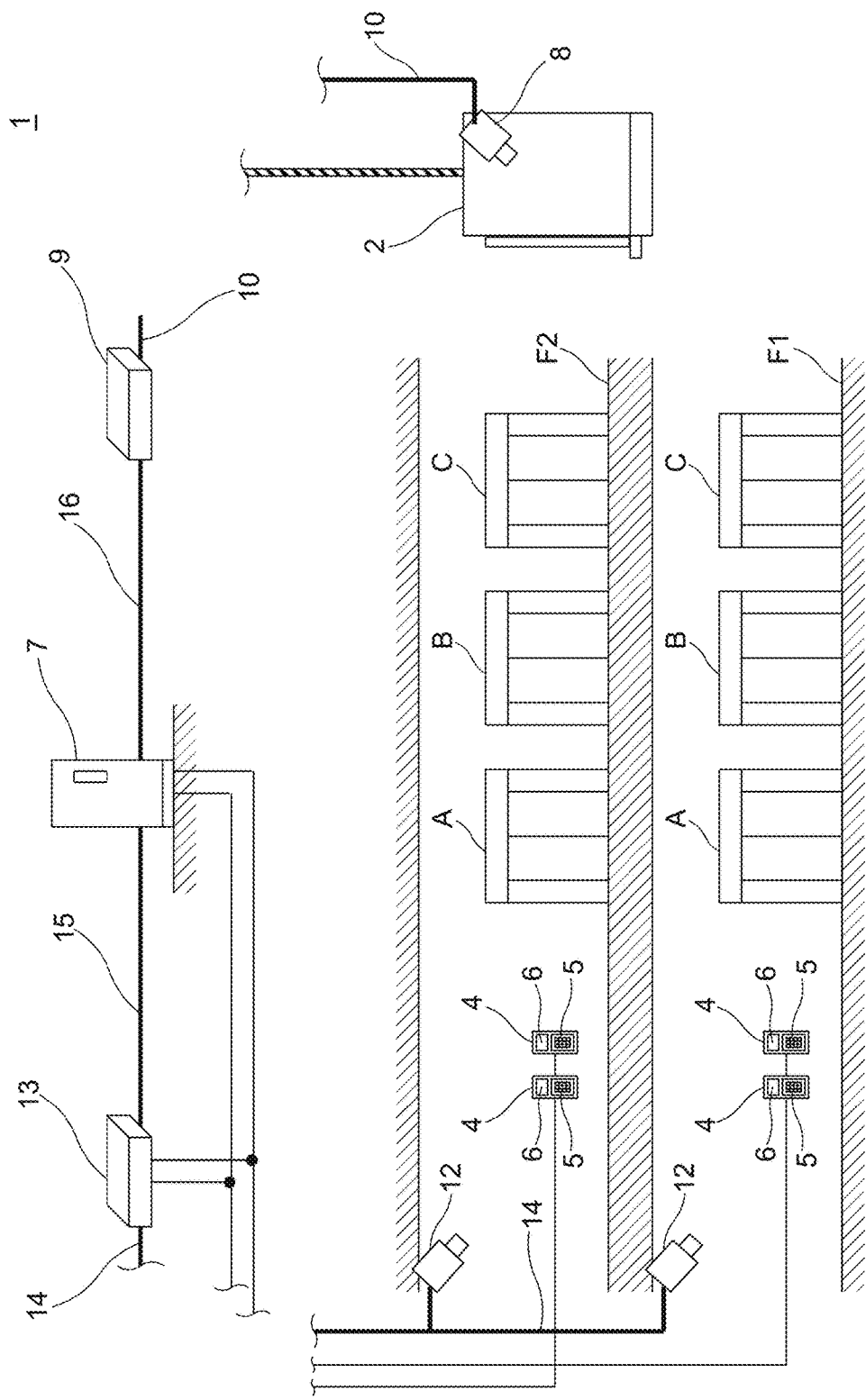
FIG. 1 is a schematic view of an elevator system of the present invention.

FIG. 1 schematically shows selected portions of an elevator system 1 of the present invention. The elevator system 1 includes three elevators A, B, C each of which is operable to transport passengers via an elevator car 2 (only one shown in FIG. 1) to any of the floors F1, F2 of a building. While three elevators A, B, C and two floors F1, F2 are shown, it will be appreciated that the present invention is applicable to elevator systems with any number of elevators servicing any number of floors.

Destination input is provided by passengers via destination entry devices 4 located on each floor F1, F2. The destination entry devices 4 are used by passengers to enter their desired destination floor before entering an elevator car 2. Each destination entry device 4 includes an input portion 5 and a display portion 6. The input portion 5 allows the passenger to indicate a particular floor F1, F2 of the building to which the passenger wishes to travel. In some examples, the input portion 5 comprises a key pad. The display portion 6 provides information to the passenger such as which of the elevators A, B, C is assigned to carry that passenger to the desired destination.

The scheduling of elevators A, B, C is coordinated by an elevator controller 7 based on destination input provided via the destination entry devices 4. Destination input is also provided to a landing image processing unit 13 as will be described below. As each passenger enters his or her destination floor on one of the destination entry devices 4, the passenger is directed to an elevator A, B, C that will most efficiently service his or her destination request. When passengers enter the elevator car 2 of their assigned elevator, the elevator controller 7 controls the elevator so as to stop at the floor the passenger has requested. In this way, passengers may reach their destination floor in an efficient manner with fewer stops than in conventional elevator systems.

At least one car image acquiring device is located in each elevator car 2 on the ceiling or upper wall thereof. The car image acquiring device may comprise a car video camera 8 or any other device which may acquire images that include a plurality of successive real-time images of the inside of the car 2. Each car video camera 8 is connected to a car image processing unit 9 via line 10.

At least one landing image acquiring device is located on each floor F1, F2 and is connected to a landing image processing unit 13 via line 14. The landing image acquiring device may comprise a landing video camera 12 or any other device which may acquire images including a plurality of successive real-time images of the landing/hallway and include the destination entry devices 4 in its field of view. The car image processing unit 9 and landing image processing unit 13 are respectively connected to the elevator controller 7 via lines 15, 16 and provide image processing results which may be used for the scheduling of elevators A, B, C to the elevator controller 7.

Figure 2:
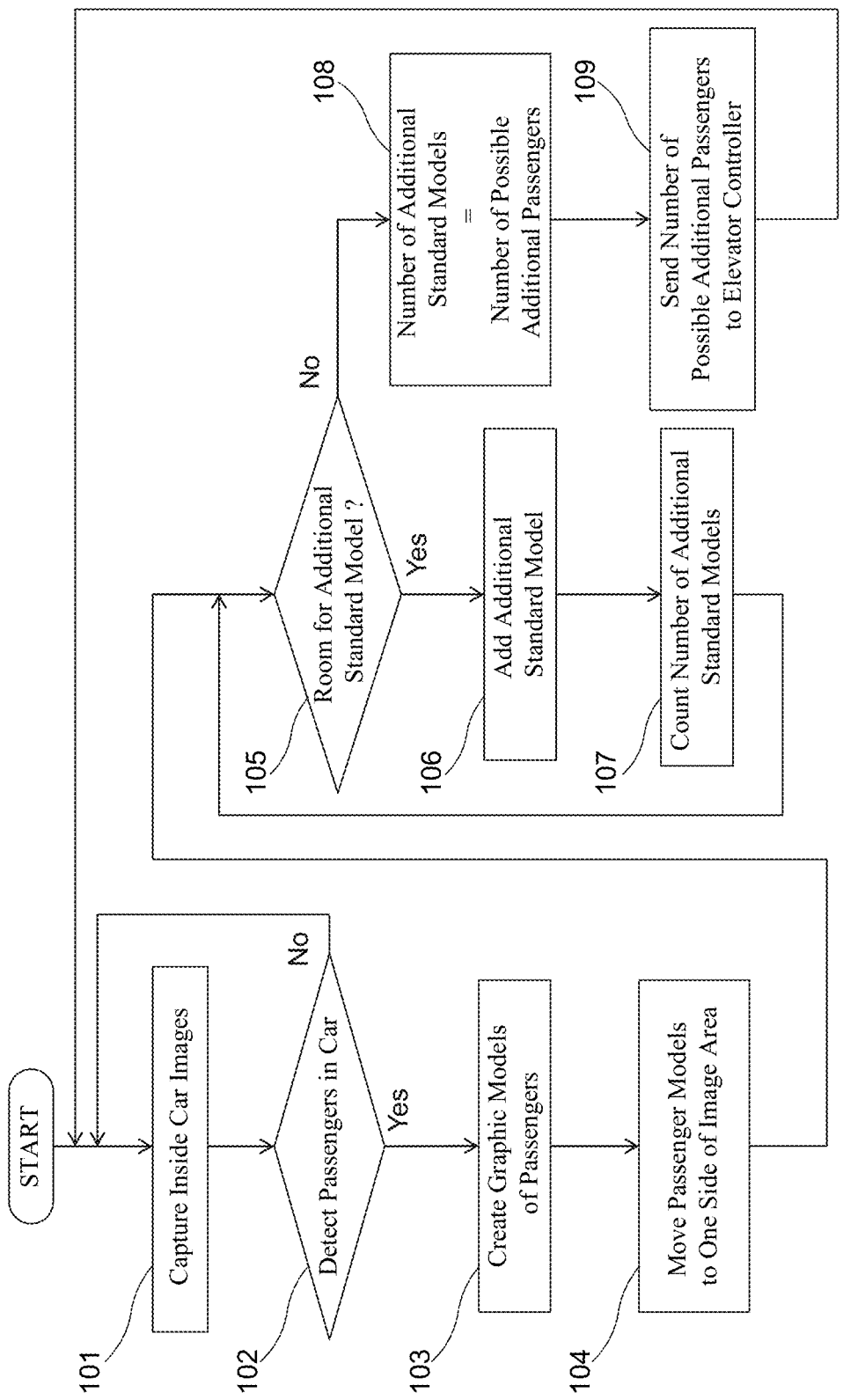
FIG. 2 is a flowchart showing the process performed by the car image processing unit of FIG. 1.
Figure 4:
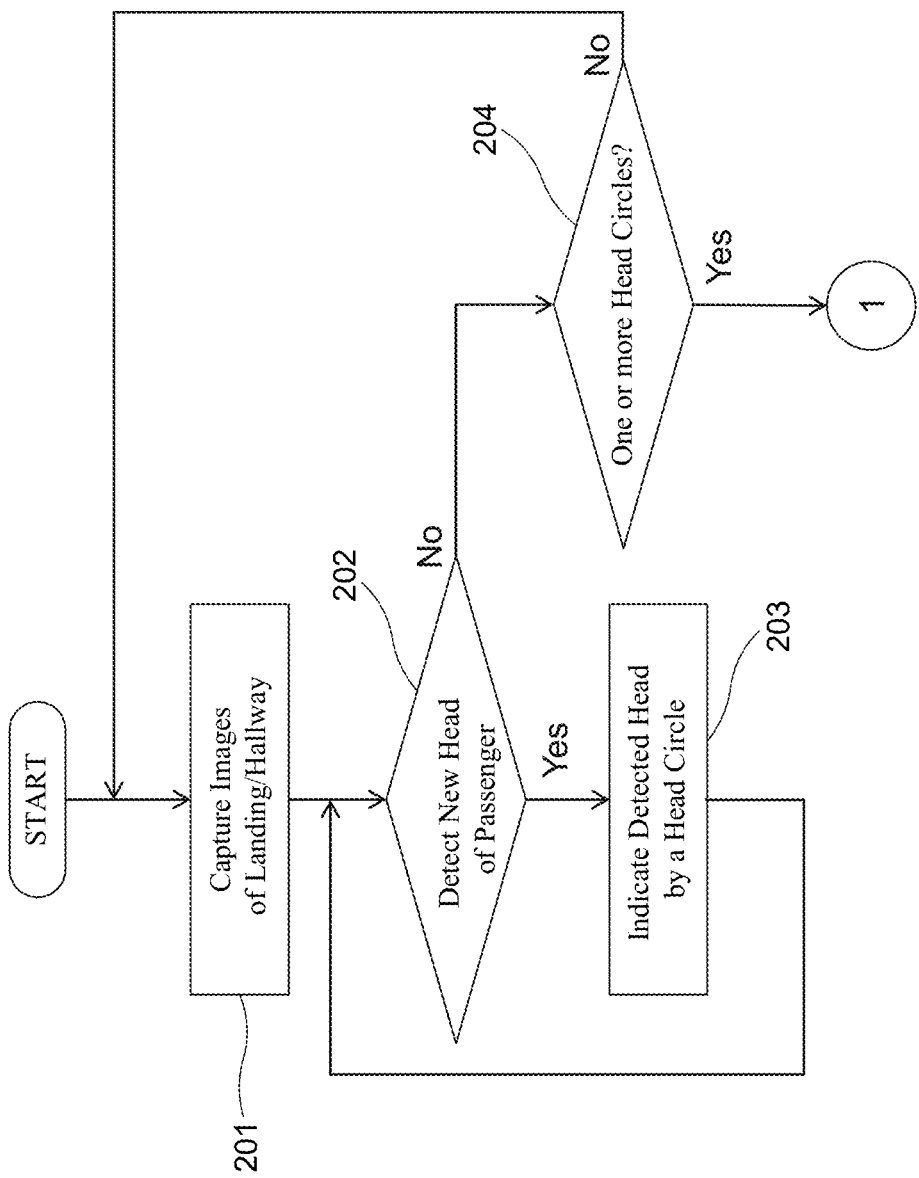
FIG. 4 is a flow chart showing a part of the process performed by the landing image processing unit of FIG. 1.
Figure 5:
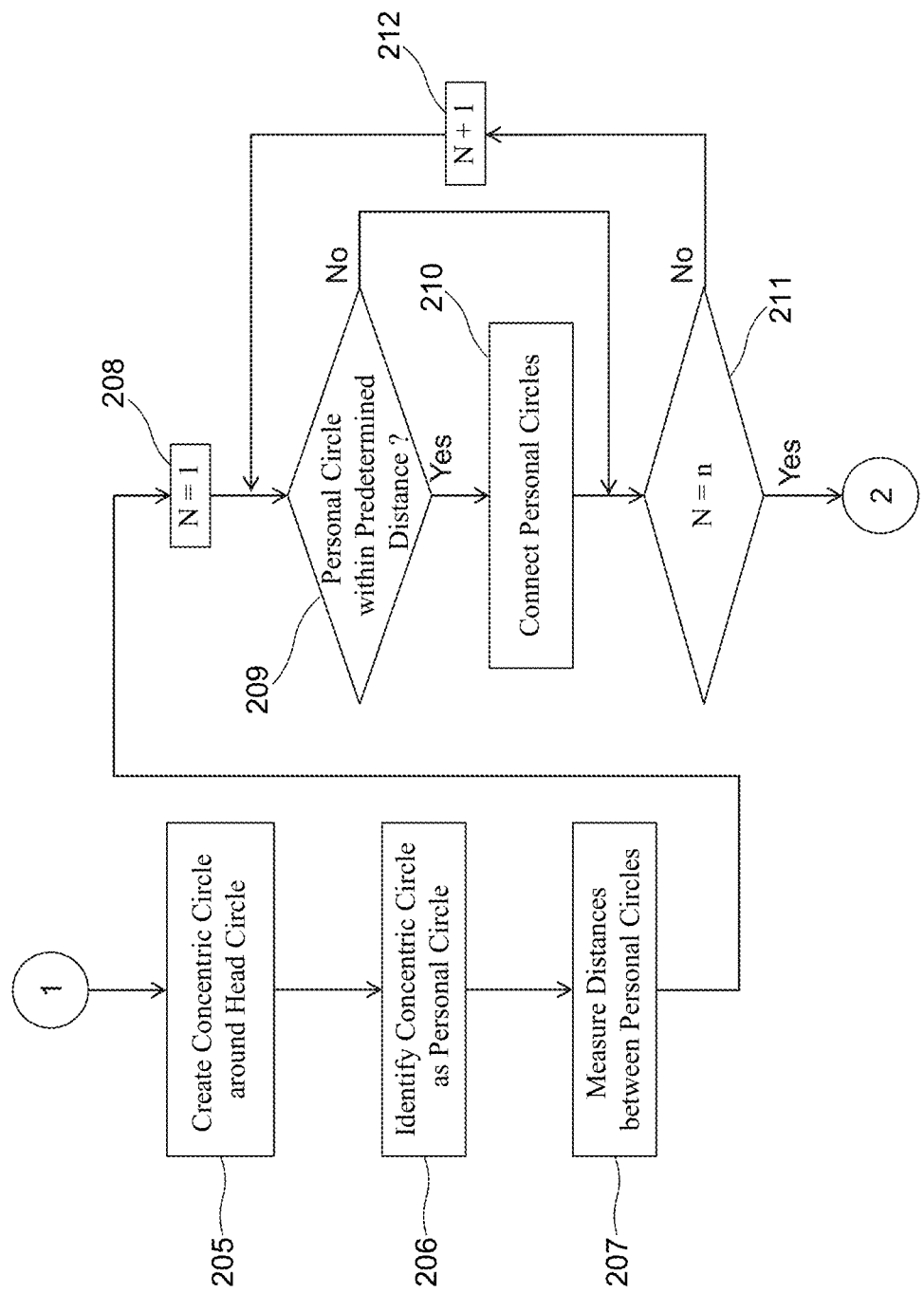
FIG. 5 is a flow chart showing a part of the process performed by the landing image processing unit of FIG. 1.
Figure 6:
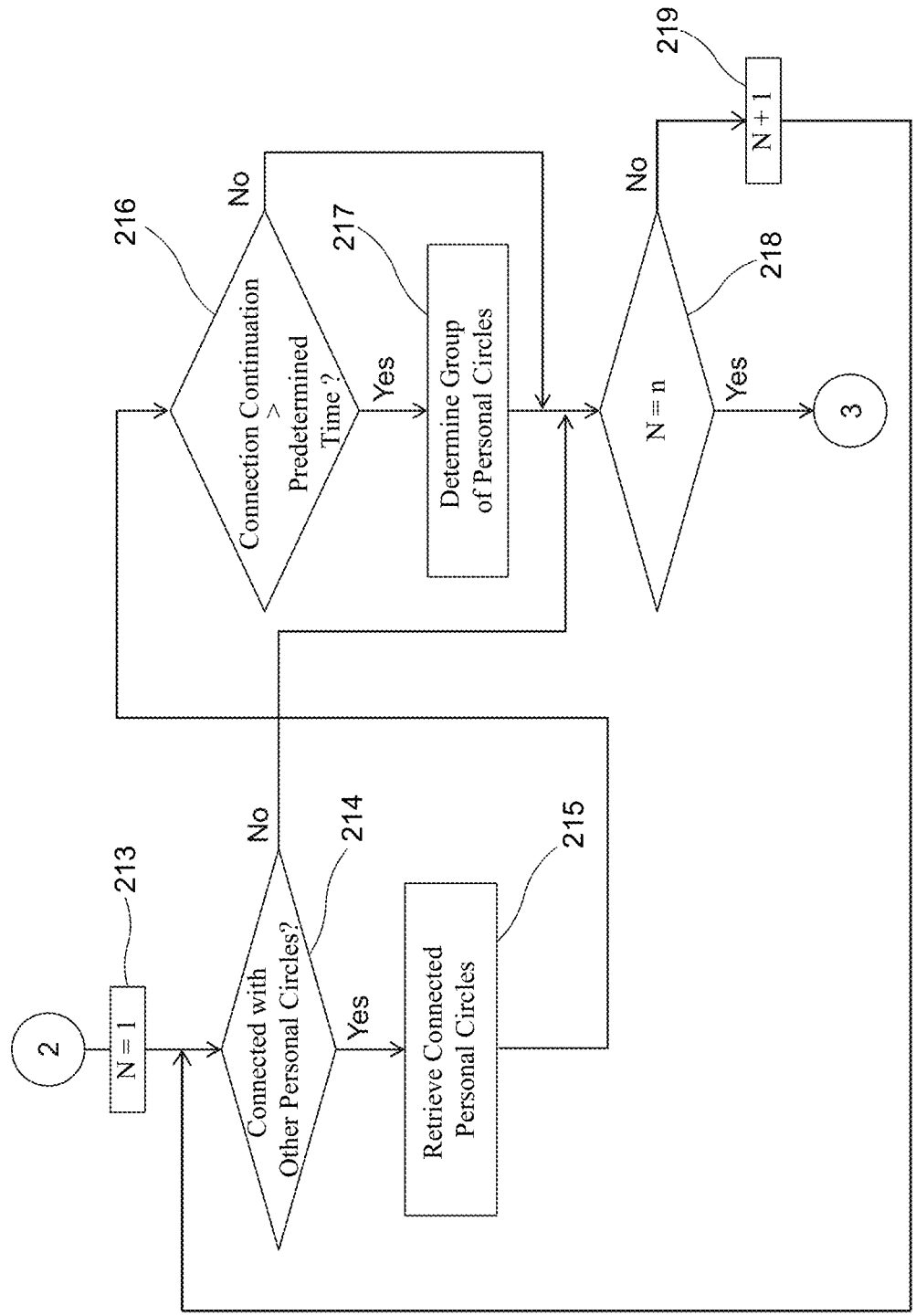
FIG. 6 is a flow chart showing a part of the process performed by the landing image processing unit of FIG. 1.
Figure 7:
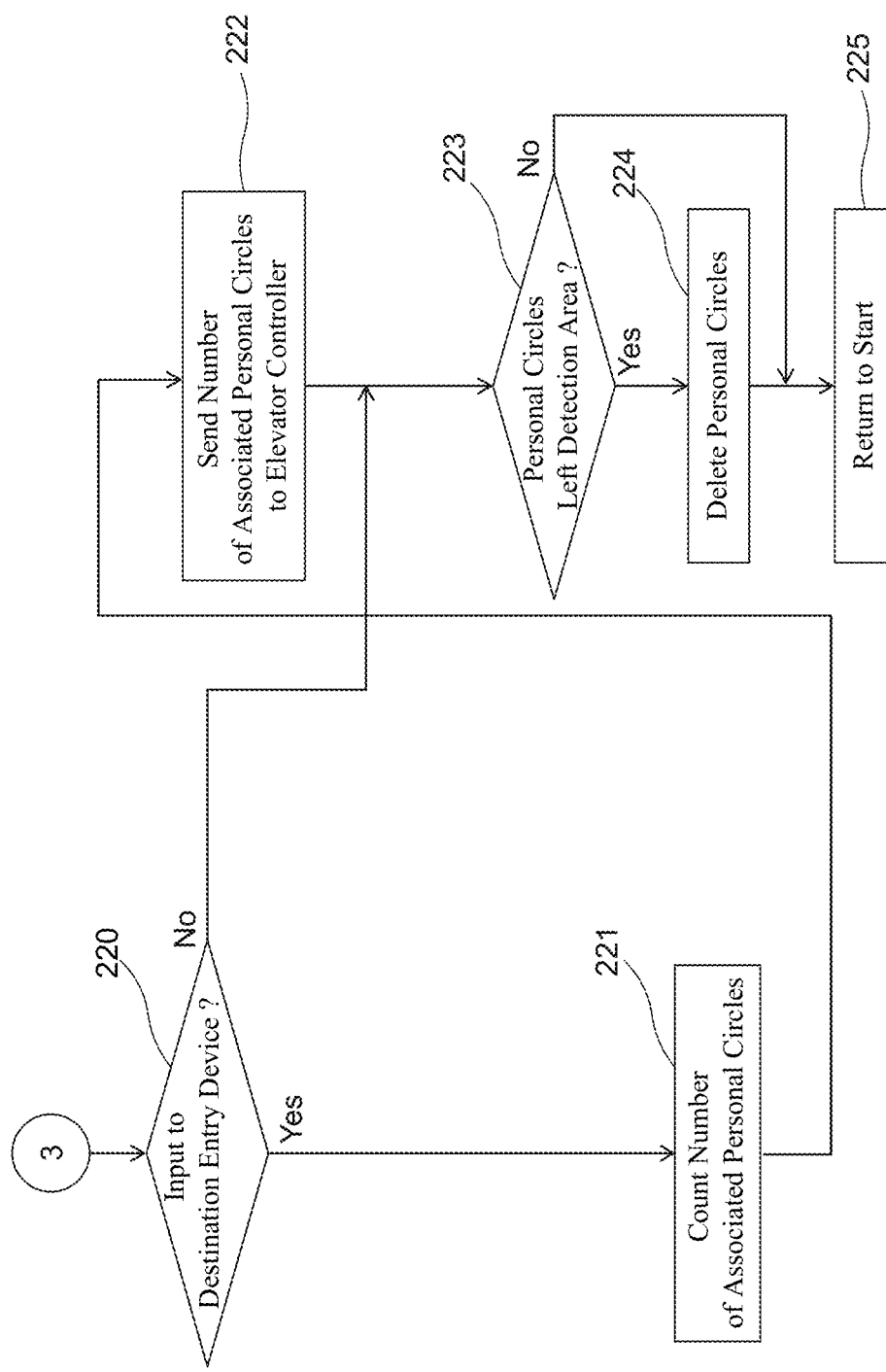
FIG. 7 is a flow chart showing a part of the process performed by the landing image processing unit of FIG. 1.

FIG. 2 is a flowchart showing the process performed by the car image processing unit 9 for determining how many more passengers can actually get on an elevator car. FIGS. 3a to 3h illustrate example results of the process performed in FIG. 2. Images are captured from the car video camera 8 in step 101 and the presence of passengers in the car 2 is detected in step 102. If no passengers are detected, the process returns to step 101 and images are continuously captured until passengers are detected.

If passengers are detected, simple graphic models 22 of the passengers are created in step 103. FIG. 3a shows an example image 17 of the inside of an elevator car 2. As shown in FIG. 3b, edges of the passenger's head and shoulders, for example, are detected in the image 17 as a circle 18 and a pair of arcs 19, 19. As shown in FIG. 3c, each of the circles 18 and pair of arcs 19, 19 are combined into a combination of a circle 18 and a near ellipse 20. As shown in FIG. 3d, each combination is adjusted to create a passenger model 22. In this way, passenger models 22 may reflect the actual size of passengers inside a car 2.

It may also be possible to create actual-sized graphic models of passengers in wheelchairs or strollers or other objects such as baggage or packages by detecting edges of such objects in a similar manner and use such models together with passenger models 22 to determine possible additional passengers.

In step 104, the passenger models 22 are moved to one side of an image area A representing elevator car space so that they do not overlap each other. FIG. 3e shows the created passenger models 22 included in the image area A and FIG. 3f shows how the passenger models 22 are moved to one side of the image area A.

In step 105, it is checked whether there is room for an additional standard model 24 which represents a standard-sized passenger. If Yes, an additional standard model 24 is added in step 106 so that it does not overlap previous models 22, 24, the number of standard models 24 is counted in step 107 and the process returns to step 105 until there is no room for an additional standard model 24.

FIG. 3g shows how the additional standard models 24 are fit in. The position of the passenger models 22 and the standard models 24 are not fixed and the models 22, 24 may be moved or turned such as to allow a maximum number of models 22, 24 to fit into the image area A, for example, with a predetermined distance being kept between each model 22, 24.

When it is determined that there is no room for an additional standard model 24 in step 105, the process proceeds to step 108 and the number of possible additional passengers who can actually get on the elevator car 2 is set to the number of standard models 24. This number is sent to the elevator controller 7 in step 109. As shown in FIG. 3h, in this embodiment, ten additional standard models 24 can fit in, meaning ten more passengers may get on the elevator car 2.

FIGS. 4 to 7 are flowcharts showing the process performed by the landing image processing unit 13 for determining groups of passengers wishing to travel together. FIGS. 8a to 8h illustrate example results of the process performed in FIGS. 4 to 7. Images are captured from the landing video camera 12 in step 201 and the presence of a new head of a passenger in the landing/hallway is detected in step 202. When a new head is detected, the detected head is indicated by a head circle 26 in step 203. Steps 202 and 203 are repeated until all heads of passengers in the landing/hallway are detected. When all heads of passengers are detected, it is determined if there is one or more head circles 26 in step 204. If Yes, the process proceeds to step 205. If No, the process returns to step 201.

Figure 8C:
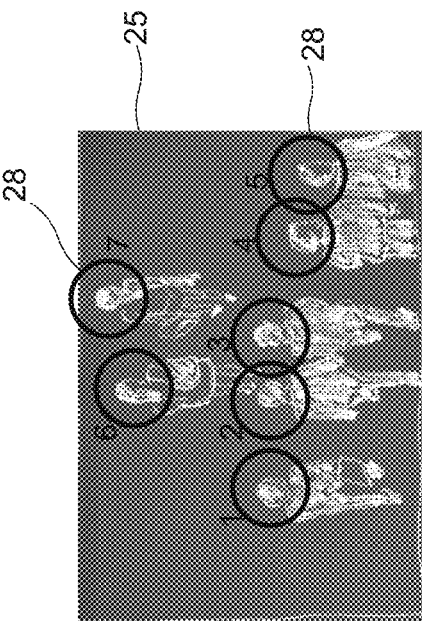
Figure 8D:
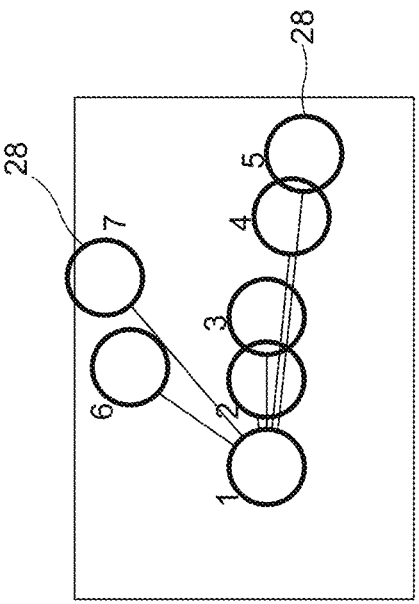
Figure 8A:
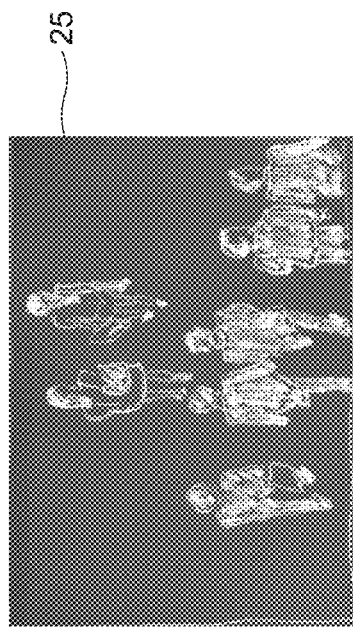
Figure 8B:
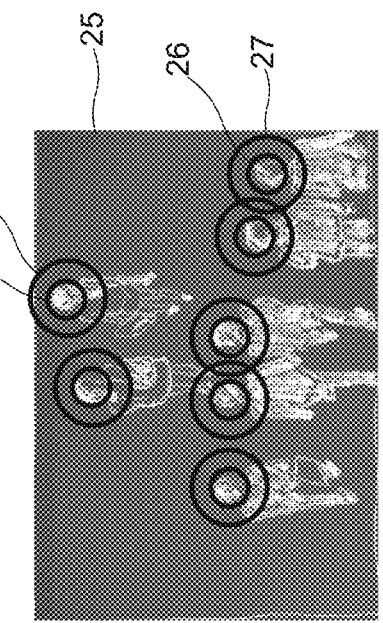

In step 205, a concentric outer circle 27 is created around each head circle 26. This concentric circle 27 represents the personal space of each passenger. FIG. 8a shows an example video image 25 of a landing/hallway. FIG. 8b shows head circles 26 indicating passenger's heads and concentric circles 27 created around them. In step 206, each concentric circle 27 is identified as an individual personal circle 28. FIG. 8c shows the personal circles 28 identified by numbers. In step 207, the distance between each personal circle 28 and the other personal circles 28 is measured. FIG. 8d shows the distance between personal circle No. 1 and the rest of the personal circles 28 as an example.

In step 208, the number N of the personal circle 28 is set to 1 and it is checked in step 209 if there is any personal circle 28 within a predetermined distance from personal circle No. 1. If yes, the personal circles 28 are connected. The first time the process reaches step 211, not all of the personal circles 28 will have been checked and the process will proceed to step 212 to increment the number of the personal circle 28 by one and steps 209 and 210 will be repeated. When all of the personal circles 28 have been checked, the process will proceed to step 213.

FIG. 8e shows the personal circles 28 having a short distance connected by lines. Personal circles No. 1 and No. 2 are connected, personal circles No. 2 and No. 3 are connected and Personal circles No. 4 and No. 5 are connected. The personal circles 28 are eventually grouped based on this relation. At this point, as shown in FIG. 8f, personal circles No. 1, No. 2 and No. 3 may be considered to comprise a group of three people, personal circles No. 4 and No. 5 may be considered to comprise a group of two people and personal circles No. 6 and No. 7 may be considered to respectively comprise a group of one person.

In step 213 the number N of the personal circle 28 is again set to 1 and it is checked if the personal circle 28 is connected with other personal circles 28 in step 214. If Yes, all connected personal circles 28 are retrieved in step 215 and it is checked whether the connection is continuing for more than a predetermined time in step 216. If Yes, the personal circles 28 connected for more than a predetermined time are determined to be associated as a group in step 217.

FIG. 8g shows how the personal circles 28 are tracked over time to check whether the connection is continuing. After a predetermined time, personal circle No. 1 has moved away from personal circles No. 2 and No. 3, personal circles No. 4 and No. 5 are still positioned within a short distance and personal circles No. 6 and No. 7 have moved closer to each other. As shown in FIG. 8h, the personal circles 28 within a predetermined distance are connected again and the personal circles 28 which are continuously connected are determined to be associated as a group. Therefore, at this point, personal circles No. 2 and No. 3 and personal circles No. 4 and No. 5 are determined to comprise a group of two people and the rest of the personal circles are not associated to others but will keep on being tracked.

The number of the personal circle 28 is incremented in step 219 until all personal circles 28 have been checked. When all personal circles 28 have been checked, the process proceeds from step 218 to step 220.

In step 220, it is checked if a hall call has been input to the destination entry device 4. If Yes, the number of personal circles 28 associated with the personal circle 28 of the passenger who inputted the call is counted in step 221 and the number of the personal circles 28 is sent to the elevator controller 7 in step 222. In step 223, it is checked whether any personal circles 28 have left the detection area. When a personal circle is no longer in the detection area, it is deleted in step 224 and the process returns to start via step 225.

Figure 9:
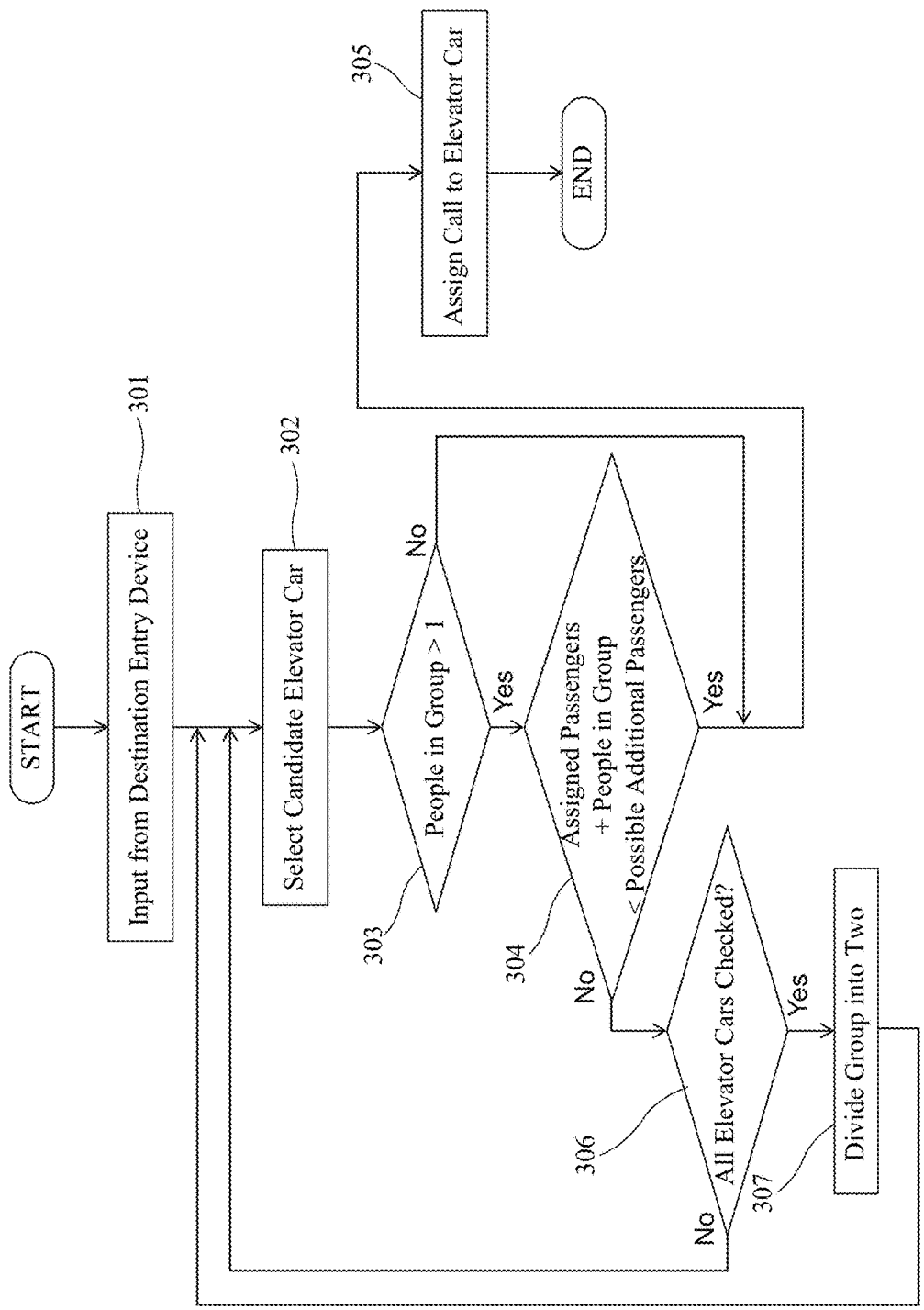
FIG. 9 is a flow chart showing how the elevator controller of FIG. 1 operates.

FIG. 9 shows how the elevator controller 7 operates. When a passenger provides destination input via the destination input device 4, the elevator controller 7 receives the number of people in the group related to that destination hall call from the landing image processing unit 13 (step 222). The elevator controller 7 also continuously receives the number of passengers who can actually board each elevator car 2 from the car image processing unit 9 (step 109) and matches each group to an elevator car 2.

Specifically, in step 301, a destination input is received from the destination entry device 4. In step 302, a candidate elevator car 2 is selected according to known car assignment algorithms. In step 303, it is checked if the number of people in the group associated with the input is larger than 1. If Yes, it is checked in step 304 if the number of possible additional passengers who can actually board the candidate elevator car 2 is larger than the number of passengers already assigned to the candidate elevator 2 plus the number of people in the group associated with the input. If Yes, the call is assigned to the candidate elevator car 2 in step 305.

If No, it is checked in step 306 if all elevator cars 2 have been checked. If No, steps 302 to 304 are repeated. If all elevator cars 2 have been checked and none of the cars 2 fulfill the condition, the program proceeds to step 307 and the group is divided into two. The program is repeated with regard to the divided groups until all people in the group are assigned to an elevator car 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling an elevator system, comprising:
    obtaining images of the inside of an elevator car;
    detecting passengers in the images; creating graphic passenger models of the detected passengers from the images; and
    determining the number of passengers who may additionally board the elevator car using the passenger models;
    wherein determining the number of passengers who may additionally board the elevator car comprises, placing the passenger models in an image area representing elevator car space so that the passenger models do not overlap;
    adding standard models representing a standard-sized passenger in the image area until there is no more space for an additional standard model; and
    setting the number of standard models included in the image area as the number of passengers who may additionally board the elevator car.

2. The method of claim 1, wherein the passenger models reflect the actual size of the passengers.

3. The method of claim 1, wherein the passenger models and standard models are fit into the image area with a predetermined spacing in between and may be moved or turned so that a maximum number of models are included in the image area.

4. A method for controlling an elevator system, comprising:
    obtaining images of the inside of an elevator car;
    detecting passengers in the images; creating graphic passenger models of the detected passengers from the images; and
    determining the number of passengers who may additionally board the elevator car using the passenger models;
    obtaining images of an elevator landing; detecting passengers in the images;
    associating the passengers as a group based on the distance between the passengers;
    assigning an elevator car to a hall call based on the number of people in the group and the number of passengers who may additionally board the elevator car.

5. The method of claim 4, further comprising tracking the detected passengers, wherein the passengers are associated as a group when the distance between the passengers is within a predetermined distance for a predetermined time.

6. The method of claim 4, wherein the number of people in the group is provided to an elevator controller when a hall call is input.

7. The method of claim 4, wherein the elevator system is a destination entry system and the hall call comprises a destination entry input.

8. The method of claim 4, wherein an elevator car is assigned to a hall call placed by a member of the group when the number of passengers who may additionally board the elevator car is larger than the number of people in the group plus passengers already assigned to that car.

9. The method of claim 8, further comprising:
    splitting the number of people in the group when there are no elevator cars which fulfill the condition.

* * * * *